Patented July 21, 1931

1,815,827

UNITED STATES PATENT OFFICE

ERNST BODMER, OF BASEL, SWITZERLAND, ASSIGNOR TO DURAND & HUGUENIN S. A., OF BASEL, SWITZERLAND, A FIRM

PREPARATION OF MORDANT DISAZO-DYESTUFFS

No Drawing. Application filed July 2, 1926, Serial No. 120,251, and in Germany July 13, 1925.

I have found that valuable mordant disazo-dyestuffs can be obtained by subjecting one amino group of paraphenylene diamino sulphonic acid (aromatic para-diaminosulphonic acid compound of the benzene series) to diazotization and subsequent combination with an aromatic-ortho-hydroxycarboxylic acid of the benzene series and consecutively subjecting the second amino group thereof to further diazotization and combination with an aromatic-ortho-hydroxycarboxylic acid of the benzene series. For this purpose I prefer to start from aromatic para-diamino-sulphonic acid compound of the benzene series which, at first, contains only one free amino group, while the other is substituted, for instance acetylated. This free amino group is diazotized and combined with one molecule of an aromatic ortho-hydroxycarboxylic acid of the benzene series. In the thus obtained mono azo dyestuff the second amino group having been substituted, i. e. converted into a non-diazotizable state, is now reconverted into its diazotizable state, for instance by saponification. Then I diazotize once more and couple with a further molecule of an aromatic ortho-hydroxycarboxylic acid of the benzene series. In this way the same aromatic ortho-hydroxycarboxylic acid of the benzene series can be introduced twice into the dyestuff molecule. But it is also possible to use two different aromatic ortho-hydroxycarboxylic acids, (salicylic acid of the benzene series, homologues or derivatives thereof, such as orthocresotinic acid, metacresotinic acid, paracresotinic acid, beta-resorcylic acid and others).

The process is illustrated by the following examples, parts being by weight.

Example I

Paraphenylene diamino sulphonic acid is acetylated in the well known manner (see German specification No. 129,000, Example 7). 23 parts of monoacetyl-para-phenylene diamino sulphonic acid are diazotized in the usual manner in a fine suspension and at a low temperature with 20 parts of hydrochloric acid and 7 parts of sodium nitrite. The insoluble diazo body is filtered off, and is stirred into a solution containing 15 parts of metacresotinic acid and 15 parts of powdered sodium carbonate. The coupling starts immediately and is terminated after having slowly added 14 parts of caustic soda lye of 40° Bé.

The monoazo dyestuff which has separated in the form of yellow crystals is filtered off, then dissolved in water and 30–40 parts of caustic soda lye; the solution is boiled for some time in order to saponify the acetyl group. There remains then a reddish yellow solution which is filtered and acidified. The dyestuff precipitates and is afterwards filtered. One dissolves in sodium carbonate, adds the necessary quantity of nitrite and acidifies at a low temperature while stirring well.

The insoluble diazo body is filtered off and stirred into a solution consisting of 14 parts of salicylic acid, 14 parts of caustic soda lye of 40° Bé. and 200 parts of ice-water. By adding 20 parts of solid sodium carbonate the coupling is terminated. The brownish orange reaction mass in which the formed dyestuff has partly precipitated, is heated up, filtered and from the filtered solution the product is salted out.

The reactions and the products are illustrated by the following formulae:

Paraphenylenediaminesulphonic acid of the constitution:

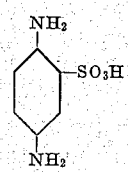

is transformed by acetylation to monoacetylpara-phenylenediaminesulphonic acid having probably the constitution:

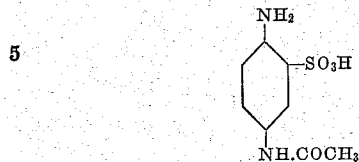

which by diazotization of the free amino group and coupling with metacresotinic acid yields an intermediate product of the constitution:

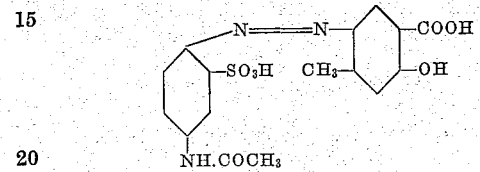

the latter giving by saponification of the acetyl group, diazotization of the free amino group thus formed and combination with salicylic acid the dyestuff of the formula:

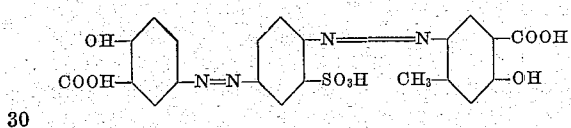

This dyestuff dissolves in water giving a yellow solution with a red tone which turns into red with a blue tone when some caustic soda lye is added. The shade of the solution obtained with concentrated sulphuric acid is violet. If water is added to the latter, the dyestuff precipitates in form of dark brown flakes.

The new dyestuff dyes chromed wool orange with a brown tone. When printed with a chrome mordant on cotton it gives a strong orange shade with a red tone, a shade which is very fast.

*Example II*

The amino-azo-dyestuff such as is obtained from acetyl-paraphenylenediamino sulphonic acid and salicylic acid in an analogous manner to that indicated in Example I is diazotized as described. This diazo compound obtained from 33.7 parts of the amino-azo-dyestuff is stirred into a mixture of 14 parts of salicylic acid, 100 parts of water and 25 parts of magnesium carbonate while cooling. A thick brown paste results which is diluted with water, acidified and moderately warmed. The insoluble dyestuff is filtered and washed with diluted muriatic acid for the purpose of eliminating the magnesium salt. The dyestuff is finally dissolved in water and alkali, filtered and salted out. The reactions and the products are illustrated by the following formulæ: Para-amino-sulphobenzeneazosalicylic acid obtained in an analogous manner to that indicated in Example I and having the constitution

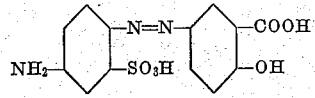

gives by diazotizing the free amino group and coupling with salicylic acid the dyestuff of the constitution:

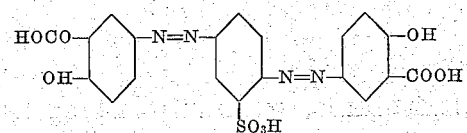

The dyestuff thus obtained is similar to that of Example I.

In all these examples salicylic acid can be replaced by the homologues or derivatives thereof such as ortho-cresotinic acid, meta-cresotinic acid, paracresotinic acid, beta-resorcylic acid and others. According to the present process dyestuffs containing twice the same aromatic ortho-hydroxy-carboxylic acid of the benzene series or containing two different aromatic ortho-hydroxy-carboxylic acids of the benzene series can be obtained.

What I claim is:

1. The herein described process for the manufacture of new mordant disazo-dyestuffs, consisting in starting from an aromatic para-diaminosulphonic acid compound of the benzene series, acylating one of the amino groups of said body to convert it into a non-diazotizable state, diazotizing the second amino group of said body and coupling the diazo compound thus obtained with an aromatic ortho-hydroxycarboxylic acid of the benzene series, then reconverting the former amino group into its diazotizable state by removing the acyl group by hydrolysis, diazotizing the thus reformed free amino group and further coupling with an aromatic ortho-hydroxycarboxylic acid of the benzene series.

2. The herein described process for the manufacture of new mordant disazo-dyestuffs, consisting in starting from para-phenylene-diaminosulphonic acid, acylating one of the amino groups of said body to convert it into a non-diazotizable state, diazotizing the second amino group of said body and coupling the diazo compound thus obtained with an aromatic ortho-hydroxycarboxylic acid of the benzene series, then reconverting the former amino group into its diazotizable state by removing the acyl group by hydrolysis, diazotizing the thus re-formed free amino group and further coupling with an aromatic ortho-hydroxycarboxylic acid of the benzene series.

3. The herein described process for the manufacture of new mordant disazoz-dyestuffs, consisting in starting from a para-diamino-sulphonic acid compound of the benzene series, acetylating one of the two amino groups of said body to convert it into a non-diazotizable state, diazotizing the second amino group of said body and coupling the diazo compound thus obtained with an aromatic ortho-hydroxycarboxylic acid of the benzene series, then reconverting the former amino group into its diazotizable state by removing the acetyl group by hydrolysis, diazotizing the thus re-formed free amino group and further coupling with an aromatic ortho-hydroxycarboxylic acid of the benzene series.

4. The herein described process for the manufacture of new mordant disazo-dyestuffs, consisting in starting from para-phenylene-diaminosulphonic acid, acetylating one of the two amino groups of said body to convert it into a non-diazotizable state, diazotizing the second amino group of said body and coupling the diazo compound thus obtained with an aromatic ortho-hydroxycarboxylic acid of the benzene series, then reconverting the former amino group into its diazotizable state by removing the acetyl group by hydrolysis, diazotizing the thus re-formed free amino group and further coupling with an aromatic ortho-hydroxycarboxylic acid of the benzene series.

5. The herein described process for the manufacture of new mordant disazo-dyestuffs, consisting in starting from a para-diamino-sulphonic acid compound of the benzene series, acetylating one of the two amino groups of said body to convert it into a non-diazotizable state, diazotizing the second amino group of said body and coupling the diazo compound thus obtained with salicylic acid, then reconverting the former amino group into its diazotizable state by removing the acetyl group by hydrolysis, diazotizing the thus re-formed free amino group and further coupling with salicylic acid.

6. The herein described process for the manufacture of new mordant disazo-dyestuffs, consisting in starting from paraphenylene-diaminosulphonic acid, acetylating one of the two amino groups of said body to convert it into a non-diazotizable state, diazotizing the second amino group of said body and coupling the diazo compound thus obtained with salicylic acid, then reconverting the former amino group into its diazotizable state by removing the acetyl group by hydrolysis, diazotizing the thus re-formed free amino group and further coupling with salicylic acid.

7. As new articles of manufacture the herein described mordant disazo-dyestuffs which correspond to the following general formula:

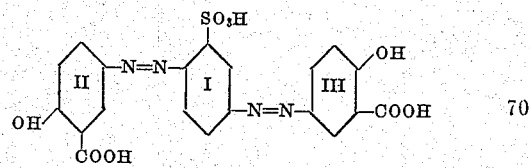

wherein the nuclei I, II and III besides the substituents indicated in the formula may bear further substituents, said mordant disazodyestuffs constituting brown to reddish-brown powders easily soluble in water, giving with concentrated sulphuric acid violet to bluish solutions and dyeing the fibre with chrome mordant fast orange to brown shades.

In witness whereof I have hereunto signed my name this 21st day of June 1926.

ERNST BODMER.